United States Patent Office 2,800,460
Patented July 23, 1957

2,800,460
DETECTION OF HYDROCARBONS

Karl Grosskopf, Lubeck, Germany, assignor to Dr. Otto Heinrich Drager, Lubeck, Germany No Drawing. Application December 27, 1954, Serial No. 477,917

Claims priority, application Germany December 29, 1953

4 Claims. (Cl. 252—408)

The present invention relates to a composition of matter for the detection of hydrocarbon vapors, especially those of aliphatic or aromatic nature and a method of producing such composition. The reagent composition according to the invention is particularly suitable for the determination of carburetted fuels and is especially adapted for use in gas testing tubes.

The reagent composition according to the invention essentially consists of a carrier, preferably silica gel, impregnated with selenious acid and charged with sulfur trioxide. This composition reacts with vaporous hyrocarbons with discoloration. When silica gel is used as the carrier, the composition is colored yellow. In the presence of hydrocarbons this yellow color is changed to brown.

The reagent composition according to the invention is preferably prepared by first impregnating the carrier with selenious acid, then charging the impregnated carrier with sulfur trioxide and then subjecting it to heat preferably to a temperature of about 180° C. The heat treatment not only increases the sensitivity of the reagent composition but the resulting composition also renders it possible to make an approximately quantitative detection. For this purpose it is necessary that a certain concentration of the selenious acid and sulfur trioxide be maintained on the carrier and that certain quantities of the air or gaseous medium to be tested be passed through the reagent composition. Gas testing pumps which are well known in the art which render it possible to measure definite quantities of the gaseous medium to be tested can be employed to pass such gaseous medium through the reagent composition.

When the reagent composition is employed in gas testing tubes, the composition is preferably adjusted in such a manner that it indicates whether or not when a certain amount of the gas to be tested has passed thereto, the hydrocarbon content of the gas is of a certain threshold concentration. For example, if air is to be tested it is possible to see whether or not the hydrocarbon content has reached the explosive limit.

The reagent composition according to the invention for the detection of vaporous hydrocarbons in gaseous mediums was, for example, prepared in the following manner:

100 grams of granular silica gel of medium activity (poured weight about 500 grams per liter) were impregnated with a solution of 3 grams of selenious acid in 50 grams of water. The impregnated gel was dried at 140° C. until a constant weight was attained. The dried composition was then placed in U-tubes and treated with sulfur trioxide fog until the total weight increase was 40 grams. After the treatment with the sulfur trioxide the gel was activated by heating at temperatures between 160 and 220° C. (preferably at 180° C.). The time required for the activation depended upon the activation temperature employed, at 180° C. it, for example, was 90 minutes.

The reagent composition thus prepared reacted even at room temperature with vapors of hydrocarbons regardless of whether they were of aliphatic or aromatic nature. The original color of the activated reagent composition was pure yellow. In the presence of hydrocarbons this color changed to brown to dark brown.

Before use, the reagent composition was placed in transparent gas testing tubes in the usual manner and such tubes were then used in the normal gas testing apparatus for the detection of hydrocarbons in gases. The quantity of the reagent composition placed in the test tube can, for example, be such as to indicate when a predetermined quantity of air has been passed therethrough whether or not the concentration of the hydrocarbons therein has reached the explosive limit.

I claim:

1. A reagent composition for the detection of vaporous hydrocarbons comprising dry silica gel impregnated with selenious acid and charged with sulfur trioxide.

2. A process for the production of a reagent composition for the detection of vaporous hydrocarbons which comprises impregnating silica gel with an aqueous solution of selenious acid, drying the impregnated gel, charging the dried impregnated gel with sulfur trioxide and heating the thus treated silica gel to a temperature between about 160° C. and 220° C.

3. The process of claim 2 in which the heat treatment of the silica gel is carried out at about 180° C. for about 90 minutes.

4. A reagent composition for the detection of vaporous hydrocarbons comprising dry silica gel impregnated with selenious acid and charged with sulfur trioxide and activated by a heat treatment at a temperature between 160° and 220° C.

References Cited in the file of this patent

UNITED STATES PATENTS

| | | |
|---|---|---|
| 2,567,251 | Stitt | Sept. 11, 1951 |
| 2,648,598 | Stitt | Aug. 11, 1953 |